(12) United States Patent
Brombach et al.

(10) Patent No.: US 10,784,690 B2
(45) Date of Patent: Sep. 22, 2020

(54) METHOD FOR CONTROLLING AN ELECTRICAL DISTRIBUTION NETWORK

(71) Applicant: Wobben Properties GmbH, Aurich (DE)

(72) Inventors: Johannes Brombach, Berlin (DE); Isabel Blaak, Aurich (DE); Katharina Schubert, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/473,759

(22) PCT Filed: Jan. 2, 2018

(86) PCT No.: PCT/EP2018/050048
§ 371 (c)(1),
(2) Date: Jun. 26, 2019

(87) PCT Pub. No.: WO2018/122405
PCT Pub. Date: Jul. 5, 2018

(65) Prior Publication Data
US 2020/0014213 A1    Jan. 9, 2020

(30) Foreign Application Priority Data

Dec. 30, 2016  (DE) .................. 10 2016 125 947

(51) Int. Cl.
*H02J 3/38*    (2006.01)
*F03D 9/25*    (2016.01)
(Continued)

(52) U.S. Cl.
CPC .............. *H02J 3/386* (2013.01); *F03D 9/257* (2017.02); *H02J 3/14* (2013.01); *H02J 3/003* (2020.01)

(58) Field of Classification Search
CPC .............. H02J 3/14; H02J 3/386; F03D 9/257
(Continued)

(56) References Cited

U.S. PATENT DOCUMENTS

| 6,512,966 B2 * | 1/2003 | Lof | ......................... H02J 3/008 700/291 |
| 7,245,037 B2 * | 7/2007 | Angquist | ............. H02J 3/1835 290/44 |

(Continued)

FOREIGN PATENT DOCUMENTS

| DE | 102013222277 A1 | 9/2014 |
| DE | 102014112979 A1 | 3/2015 |

(Continued)

*Primary Examiner* — Pedro J Cuevas
(74) *Attorney, Agent, or Firm* — Seed Intellectual Property Law Group LLP (57) ABSTRACT

A method for controlling an electrical distribution network, wherein a network control station is provided to control the electrical distribution network and the electrical distribution network comprises a plurality of balancing areas, wherein each balancing area outputs or receives an exchange power to or from the electrical distribution network, and wherein at least one of the balancing areas has at least one generator, in particular a wind farm, for generating a generator power and additionally at least one consumer for receiving a consumer power, wherein at least one balancing area controller is provided to control the at least one generator or wind farm, and the method comprises the following steps: reception by the balancing area controller from the network control station of a value of an exchange power to be set, wherein the exchange power is defined as a difference between the consumer power and the generator power, drawing up by the balancing area controller of a deployment plan for adherence to or attainment of the exchange power to be set, wherein the deployment plan is provided to control the generators and consumers and is drawn up in such a way that a difference
(Continued)

between the attained exchange power and the exchange power to be set is minimal, and generation of electrical power by means of the at least one generator or wind farm depending on the deployment plan.

20 Claims, 6 Drawing Sheets

(51) Int. Cl.
*H02J 3/14* (2006.01)
*H02J 3/00* (2006.01)

(58) Field of Classification Search
USPC .............. 290/44, 55; 323/207, 210; 700/287
See application file for complete search history.

(56) References Cited

U.S. PATENT DOCUMENTS

| | | | |
|---|---|---|---|
| 8,698,351 B2* | 4/2014 | Castelaz | B60L 55/00 307/25 |
| 8,847,562 B2* | 9/2014 | Agudo Araque | H02J 3/1842 323/210 |
| 8,866,334 B2* | 10/2014 | Donnelly | H02J 1/10 290/2 |
| 8,930,034 B1* | 1/2015 | Wilson | H02J 3/38 700/286 |
| 9,136,703 B2* | 9/2015 | Cummings | H01L 31/02021 |
| 9,280,797 B2 | 3/2016 | Ekanayake et al. | |
| 9,436,200 B2* | 9/2016 | Varma | G05F 1/66 |
| 9,496,754 B2 | 11/2016 | Kulathu et al. | |
| 9,568,930 B2* | 2/2017 | Castelaz | B60L 55/00 |
| 9,742,191 B2 | 8/2017 | Beekmann | |
| 9,785,181 B2* | 10/2017 | Ichino | H02J 3/36 |
| 9,841,778 B2* | 12/2017 | Varma | G05F 1/66 |
| 9,851,737 B1* | 12/2017 | Wilson | H02J 3/38 |
| 9,915,243 B2* | 3/2018 | Sagi | F03D 7/048 |
| 9,973,125 B2* | 5/2018 | Brogan | G05F 1/455 |
| 9,998,050 B2* | 6/2018 | Brogan | H02P 21/50 |
| 10,063,176 B2* | 8/2018 | Brogan | F03D 7/0284 |
| 10,072,633 B2* | 9/2018 | Brogan | F03D 7/0276 |
| 10,128,658 B2* | 11/2018 | Ilic | H02J 3/38 |
| 10,263,427 B2* | 4/2019 | Froehner | G05B 19/042 |
| 10,424,935 B2* | 9/2019 | Varma | H02M 7/44 |
| 10,447,038 B2* | 10/2019 | Wang | H02J 3/381 |
| 10,516,266 B2* | 12/2019 | De Ridder | G05B 15/02 |
| 10,523,005 B2* | 12/2019 | Ekselius | G07F 15/005 |
| 10,566,793 B2* | 2/2020 | Sun | H02J 13/0086 |
| 10,571,948 B2* | 2/2020 | Varma | H02J 3/1842 |
| 2002/0084655 A1* | 7/2002 | Lof | F03D 7/048 290/44 |
| 2003/0006613 A1* | 1/2003 | Lof | F03D 7/048 290/44 |
| 2005/0127680 A1* | 6/2005 | Lof | H02J 3/386 290/44 |
| 2006/0214643 A1* | 9/2006 | Angquist | H02J 3/1835 322/17 |
| 2007/0079611 A1* | 4/2007 | Doland | F03G 6/068 60/495 |
| 2007/0124026 A1 | 5/2007 | Troxell et al. | |
| 2008/0121525 A1* | 5/2008 | Doland | H02J 15/00 204/661 |
| 2010/0023174 A1 | 1/2010 | Nagata et al. | |
| 2011/0089760 A1* | 4/2011 | Castelaz | G05B 15/02 307/25 |
| 2011/0215640 A1* | 9/2011 | Donnelly | H02J 1/10 307/21 |
| 2012/0080420 A1* | 4/2012 | Hui | H02J 3/1814 219/482 |
| 2012/0112714 A1* | 5/2012 | Agudo Araque | H02J 3/1842 323/210 |
| 2013/0035800 A1 | 2/2013 | Kulathu et al. | |
| 2013/0249319 A1* | 9/2013 | Cummings | H02J 1/102 307/131 |
| 2014/0046500 A1* | 2/2014 | Varma | G05B 19/0426 700/298 |
| 2014/0188689 A1 | 7/2014 | Kalsi et al. | |
| 2014/0330446 A1* | 11/2014 | Castelaz | G05B 15/02 700/297 |
| 2014/0379159 A1 | 12/2014 | Kitagishi | |
| 2015/0115905 A1* | 4/2015 | Hui | H02J 3/18 323/207 |
| 2015/0240784 A1* | 8/2015 | Sagi | F03D 9/10 700/287 |
| 2015/0355666 A1* | 12/2015 | Ichino | G05F 5/00 307/52 |
| 2016/0105023 A1 | 4/2016 | De Ridder et al. | |
| 2016/0248254 A1 | 8/2016 | Huomo et al. | |
| 2016/0363950 A1* | 12/2016 | Friedrich | G05F 1/66 |
| 2017/0009738 A1* | 1/2017 | Brogan | F03D 7/0276 |
| 2017/0009743 A1* | 1/2017 | Brogan | H02J 3/386 |
| 2017/0009744 A1* | 1/2017 | Brogan | H02J 3/36 |
| 2017/0009745 A1* | 1/2017 | Brogan | F03D 9/257 |
| 2017/0031379 A1* | 2/2017 | Varma | H02J 3/383 |
| 2017/0047737 A1* | 2/2017 | Ekselius | G07F 15/005 |
| 2017/0250540 A1* | 8/2017 | Varma | H02J 3/24 |
| 2017/0256944 A1* | 9/2017 | Hui | H02J 3/1842 |
| 2017/0256948 A1* | 9/2017 | Froehner | H02J 3/381 |
| 2018/0052478 A1* | 2/2018 | Varma | G05F 1/66 |
| 2018/0335020 A1* | 11/2018 | Ayiranazhi Cailakam | F03D 7/0284 |
| 2019/0103743 A1* | 4/2019 | Sun | H02J 3/18 |
| 2019/0148941 A1* | 5/2019 | Wang | H02J 13/0017 700/287 |
| 2019/0305556 A1* | 10/2019 | Caliao | F03D 9/25 |
| 2019/0356164 A1* | 11/2019 | Ghaemi | G05B 13/048 |
| 2020/0014213 A1* | 1/2020 | Brombach | H02J 3/14 |
| 2020/0036192 A1* | 1/2020 | Varma | H02M 7/44 |
| 2020/0052487 A1* | 2/2020 | Trudel | G01R 31/42 |

FOREIGN PATENT DOCUMENTS

| | | |
|---|---|---|
| EP | 2806520 A1 | 11/2014 |
| EP | 3214718 A1 | 9/2017 |
| RU | 2597235 C2 | 9/2016 |
| WO | 2007/065135 A2 | 6/2007 |
| WO | 2011/027195 A1 | 3/2011 |

* cited by examiner

METHOD FOR CONTROLLING AN ELECTRICAL DISTRIBUTION NETWORK

BACKGROUND

Technical Field

The present invention relates to a method for controlling an electrical distribution network which has a plurality of balancing levels. The present invention furthermore relates to a balancing level controller, and also a wind farm.

Description of the Related Art

The operation of electrical supply networks, such as, for example, the European grid system, is generally known.

For geopolitical reasons, electrical supply networks are usually subdivided into a plurality of network-balancing systems which are in case responsible for the operational management of a section of the electrical grid system and control the latter in a centralized manner.

The sections themselves are interconnected by means of an electrical transmission network in order to exchange electrical power with one another or transport electrical energy over long distances. The actual distribution of the electrical energy within a section is performed via the electrical distribution network.

The electrical supply network is controlled by means of a series of control mechanisms which are intended to guarantee the operational reliability of the corresponding section.

One example of a control mechanism of this type is a balancing power provision which provides a balancing power, for example depending on a frequency change, in order to set a power balance between generated and consumed power.

However, in the hitherto known control mechanisms, these powers usually differ from one another, particularly since the actual load does not correspond to the forecast load. As a result, further control mechanisms must in turn be employed at high cost in order to compensate this difference, since differences between generated and consumed power can result in disruptions in the electrical distribution network, for example an underfrequency in the electrical distribution network.

A difference between generated and consumed power is usually compensated within an electrical distribution network by connecting or disconnecting generators and/or consumers in order to provide a balancing power, and/or by exchanging interconnection power with other electrical distribution networks, in particular via the electrical transmission network or via interconnection lines.

Due to the increasing penetration of electrical supply networks with renewable energies, the operational management of the electrical supply networks or the electrical distribution networks is becoming increasingly more costly, particularly in terms of the hitherto known control mechanisms. One particular reason for this is that energy sources of this type, in particular wind power installations and photovoltaic installations, can fluctuate in terms of their output power. Mainly decentralized distribution and a different type of power feed-in compared with the feed-in known from conventional power stations represent additional special characteristics. A faster and more precise provision of balancing power, for example, is therefore becoming increasingly important, but at the same time its controllability is decreasing due to the nature of renewable generators. Taking account of the necessary operational reliability and, in particular, taking account of existing operational management, the necessary operational reliability of an electrical supply network or an electrical distribution network can consequently be guaranteed in future only with difficulty or only at high or higher cost.

The German Patent and Trademark Office has identified the following prior art in the priority application for the present application: EP 3 214 718 A1; DE 10 2013 222 277 A1, DE 10 2014 112 979 A1, US 2010/0023174 A1, US 2014/0379159 A1 and US 2016/0248254 A1.

BRIEF SUMMARY

Provided is a method which enables an electrical distribution network to be operated in an operationally optimized manner with a high degree of integration of renewable energies. The term "renewable energies" refers here to generators which use renewable energies. However, an alternative to hitherto known solutions is at least intended to be proposed.

A method is thus proposed for controlling an electrical distribution network. A network control station is provided accordingly to control the electrical supply network and the electrical distribution network is subdivided into a plurality of balancing areas. A balancing area is essentially understood to mean an interconnection of a plurality of generators and/or consumers which are combined in the operational management in relation to third parties to form a node or a balance node.

At least one balancing area furthermore has at least one generator, in particular a wind farm, and an additional consumer. A wind farm is understood here to mean, in particular, a physical grouping of wind power installations which are organizationally and technically interconnected.

At least one balancing area controller is furthermore provided to control the at least one generator or the wind farm. The balancing area controller is therefore at least configured to control a generator of electrical energy, preferably a wind farm, for example through the transmission of reference values, in particular active and/or reactive power reference values.

In order to control the generator or the wind farm, i.e., in particular, to generate electrical power by means of the at least one wind farm, the balancing area controller receives an exchange power to be set, i.e., a value of the exchange power to be set, from the network control station. The balancing area controller is thus also configured to receive information relating to a requested exchange power from a control station, for example via a secure line.

The exchange power itself is defined as the sum of all generated and consumed powers of the generators and consumers which are designed to be controllable by the balancing area controller. If the sum is positive, a power excess prevails within the balancing area which can be made available to other balancing areas, i.e., can be exchanged with the latter. If the sum is negative, a power deficit prevails within the balancing area which can be compensated, for example, by deactivating consumers or by drawing a power from a different balancing area, i.e., an exchange power.

If the exchange power to be set is now, for example, 0 MW, the balancing area does not have to deliver any electrical power to the electrical supply network or other balancing areas. If the exchange power to be set is, for example, 100 MW, the balancing area has to provide this power as an excess by means of its generators or to retain it within the balancing area, i.e., too much power is deliberately generated within the balancing area in order to compensate, for example, a power deficit in a different balancing area.

A deployment plan is drawn up, in particular a deployment plan is drawn up by the balancing area controller, on the basis of the exchange power to be set. The deployment plan is provided in order to control the generators and consumers of the balancing area in such a way that a difference between the attained or set exchange power and the exchange power to be set is minimal. The deployment plan is therefore drawn up in such a way that the prevailing exchange power, i.e., the actual exchange power, also corresponds to the exchange power to be set.

For example, the exchange power to be set is 0 MW and the consumers of the balancing area require 20 MW. In this case, the deployment plan provides a power to be generated of 20 MW for the at least one wind farm. Within the balancing area, 20 MW are then generated and 20 MW are consumed, so that an actual exchange power of 0 MW is present. The generated and the consumed power thus compensate one another within the balancing area. However, if the generator or wind farm cannot generate the required power of 20 MW due to prevailing wind conditions, this can be reported back from the generator or from the wind farm to the balancing area controller. The balancing area controller then forwards this to the network control station in order to obtain a new exchange power to be set from the network control station, or instructs other generators of the balancing area to generate more electrical power.

In order to carry out the method, the deployment plan preferably comprises reference values, particularly preferably active power and reactive power reference values in order to thus control the generators and, in particular, the consumers, of the balancing area. The reference values are preferably calculated by means of at least one boundary condition in such a way that the power output of the at least one wind farm is maximal. A maximum integration of the renewable energies within the balancing area, for example, can be achieved by means of a boundary condition of this type and a flexible power can simultaneously be made available to the overlaid electrical supply network.

It is thus proposed, in particular, that the exchange power to be set and/or the deployment plan is/are optimized by means of at least one iterative method, for example by means of an optimized load flow calculation or by means of an optimized power flow. The deployment plan or the reference values for the generators can be calculated, for example, by combining the entire balancing area into a node or balance node, wherein a separate load flow analysis is carried out for the balance node itself within which the power generated by the or a wind farm is intended to be maximal.

The wind farm then generates electrical power depending on the deployment plan or on the reference values. The wind farm therefore feeds an electrical power into the electrical distribution network, the amount of said power corresponding to the reference value of the deployment plan. The reference value itself may be constant or may vary over time. In one particularly preferred embodiment, the deployment plan and accordingly the reference value which may also vary over time are created for a predefined time interval. The deployment plan thus comprises a multiplicity of timetables for the individual generators and, in particular, for the individual consumers of the balancing area which have varying reference values over time. A power distribution within the balancing area is thus controlled with the deployment plan. For this purpose, generators and/or consumers of this balancing area are provided with reference values which may be variable over time. Each reference value can be referred to as a timetable or individual timetable in order to emphasize thereby that a progression can also be specified as a reference value.

It is particularly advantageous in the method that the electrical distribution network can be controlled significantly more simply by means of a plurality of balance nodes which comprise a plurality of generators and consumers. The particularly complex system of an electrical distribution network is thus combined into a plurality of balance nodes by means of the method and is thereby operated in a more optimized manner, in particular with a higher degree of integration of renewable energies. It is thus proposed to provide exchange power in a targeted manner by means of a system having a plurality of balance nodes, wherein the individual balance nodes operate as autonomously as possible in order to guarantee a high degree of integration of renewable energies. This high autonomy of each balancing area is enabled, in particular, by carrying out a separate load flow analysis, for which the network control station merely specifies boundary conditions, for each balancing area.

Reference values are preferably transmitted by the balancing area controller to the at least one wind farm and preferably to the at least one additional consumer, wherein the reference values are selected depending on the deployment plan in such a way that the difference between the exchange power and the exchange power to be set is minimal.

The deployment plan is thus implemented by means of reference values which are transmitted from the balancing area controller to the wind farm. For this purpose, the wind farm has, for example, a wind farm controller which is configured to receive reference values from the balancing area controller.

In addition, the balancing area controller is configured to transmit data, in particular reference values, to the generators and, in particular, to the consumers of the balancing area. In a further embodiment, the balancing area controller is advantageously functionally integrated into a or the wind farm controller. This is particularly advantageous if the wind farm is one of the largest or is the largest of the generators in the balancing area, since signal delays can be minimized and a higher resilience can be guaranteed as a result.

The reference values are furthermore selected in such a way that the difference between the exchange power and the exchange power to be set is minimal. The reference values are therefore selected in such a way that the exchange power to be set which is received from the network control station can also be generated or implemented. This is relevant, in particular, in respect of renewable energies, in particular wind energy, since the latter is dependent on the prevailing weather conditions, in particular the prevailing wind conditions. For such a case, the deployment plan also comprises reference values which enable the consumers to be controlled in such a way that they consume less power or are restricted.

At least one forecast value is preferably defined by the balancing area controller for the exchange power providable and/or generator power generatable by the balancing area for a predefined forecast period and the at least one forecast value is transmitted from the balancing area controller to the network control station, wherein the forecast value preferably comprises an instantaneous value which reflects the instantaneously attained exchange power.

The balancing area controller thus defines a generatable generator power and/or a providable power for a predefined time period for the balancing area which is preferably combined into a balance node. This can be done, for example, by summing guaranteed minimum powers. The at least one wind farm can, for example, guarantee 100 MW for the next 15 minutes on the basis of the prevailing wind conditions and the additional consumer of the balancing area, for example a factory, requires 80 MW for the same 15 minutes. The providable exchange power is then 20 MW. The generatable generator power of 80 MW and/or the providable minimum power of 20 MW are then transmitted by the balancing area controller as a forecast value or forecast values to the network control station.

The forecast values preferably comprise an instantaneous value, i.e., an actual value, for this purpose, wherein this value reflects the attained exchange power. This actual value, i.e., the instantaneous value, is particularly preferably an actual power over a short time period, for example the actual power over 1 minute.

The actual value is thus, for example, 15 MW and the providable exchange power is 20 MW. The balancing area controller therefore reports not only the instantaneous exchange power of 15 MW, but also the possible exchange power of 20 MW, to the network control station. The enables the network operator, in particular the network control station, to optimize the operational management of the electrical distribution network by means of the providable exchange power and, in particular, to integrate more renewable energies into its electrical distribution network. In this cited example, the distribution network operator can now freely dispose of 5 MW, i.e., it can increase the exchange power of the balancing area to 20 MW in a targeted manner in order to relieve the load on other balancing areas, or it can leave the exchange power to be set at 15 MW, as a result of which the balancing area potentially has 5 MW which can be used, for example, to increase the power fed in from a wind farm by 5 MW and reduce the power fed in from a conventional power station by 5 MW. The network control station can request this balancing power by increasing the desired exchange power or the exchange power to be set by this balancing power. The balancing power is then provided in the balancing area concerned by the balancing area controller.

The predefined forecast time period is preferably one day or has an upper limit of 24 hours.

The predefined forecast time period for the forecast value is therefore at most 24 hours. A forecast value is transmitted accordingly from the balancing area controller to the network control station at least once per day. The frequency of the data exchange is determined, in particular, by the geographical conditions and the time of year. It is thus advantageous, for example, to transmit forecast values significantly more frequently at times of the year when the weather changes quickly.

The exchange power to be set is preferably determined depending on a or the forecast value and/or on an or the instantaneous value.

The exchange power to be set which is transmitted by the network control station and is received by the balancing area controller is thus determined on the basis of a forecast value which has preferably been defined by the balancing area controller.

The exchange power to be set is thus preferably determined iteratively on the basis of a forecast. The balancing area controller reports, for example, that the at least one wind farm has a generatable generator power of 60 MW for the next 15 minutes. The network control station then determines, for example, an optimum exchange power of 0 MW on the basis of all generatable generator powers. This optimum exchange power is then transmitted from the network control station to the balancing area controller as the exchange power to be set. The balancing area controller in turn receives this exchange power to be set and determines a deployment plan therefrom for the balancing area for the next 15 minutes which comprises a reference value varying over time for the at least one wind farm. The reference value is, for example, 40 MW for the first 5 minutes of the next 15 minutes and 55 MW for the last 10 minutes of the next 15 minutes. Depending on the selection of the boundary conditions and iteration conditions within the method, electrical powers are therefore generated by means of the at least one wind farm depending on the deployment plan which was drawn up on the basis of a forecast value.

The forecast value is preferably based on parameters of the generator, in particular the wind farm and/or at least one further generator, in particular in each case on the rated power of the generator, in particular the wind farm, or the at least one further generator, and/or on a weather forecast for the balancing area.

The forecast value is thus based on state parameters of the balancing area, for example on the rated power of the generators of the balancing area. A forecast value of this type can, for example, form an upper limit or can serve as a reference parameter. If the forecast value comprises, for example, a wind farm which can only guarantee a power of 10 MW for the next 24 hours, the boundary conditions are set so that the timetable for the wind farm or the reference values for the wind farm do not exceed this power of 10 MW. The parameters are thus used as boundary conditions to optimize the operational management of the electrical distribution network.

The use of a weather forecast for the balancing area is furthermore particularly advantageous for determining the forecast value for the balancing area. The forecast values determined using a weather forecast can improve the quality of the forecast values by a multiple, particularly in the renewable energies domain.

The exchange power of the balancing area is preferably characterized by a reactive power value and an active power value.

The exchange power thus comprises a positive or negative reactive power value and a positive or negative active power value. A positive power value describes an increase in power within the balancing area which is made available as exchange power to the electrical supply network or other balancing areas. A negative power value describes a decrease in power within the balancing area which is removed from the electrical distribution network as exchange power.

It is particularly advantageous here that not only pure active power, but also reactive power, is made available as exchange power within the method. A procedure of this type enables, in particular, a cost-effective operational management of the electrical distribution network.

The deployment plan preferably comprises a predefined time interval which has optimized reactive and/or active power reference values, wherein the predefined time interval is particularly preferably 15 minutes or preferably 5 minutes or preferably 1 minute.

The deployment plan is thus configured by a multiplicity of reactive and/or active power reference values which are reduced or are variable over time. The implementation of the deployment plan is limited by the predefined time interval. The deployment plan comprises, for example, active power reference values for all generators of the balancing area for the next 15 minutes. These active power reference values may also change within these 15 minutes. For example, 15 MW for 5 minutes and then 20 MW for 10 minutes, so that the active power reference value for the predefined time interval has two different reference values in terms of amount.

The deployment plan itself is furthermore revised cyclically depending on the predefined time interval so that the generators continuously have a deployment plan in order to generate electrical power depending on the deployment plan.

A plurality of balancing areas are preferably provided and the deployment plan is defined in such a way that the exchange powers to be attained for the balancing areas are minimized in terms of amount and/or the exchange powers to be attained for the balancing areas are minimized via an optimization method, in particular so that the exchange powers to be attained for the balancing areas are minimized using a least squares method and/or the exchange powers to be attained for the balancing areas are optimized via a cost function and/or a potential emission of pollutants by conventional generators of the electrical supply network, in particular of the balancing areas, such as, for example, nitrogen oxides or $CO_2$, is minimized.

The method is thus used, in particular, to optimize the operational management of the entire electrical supply network. The exchange powers between the individual balancing areas are optimized, for example, so that the physical load for the electrical supply network or distribution network is minimized. However, it is furthermore also possible to reduce the pollutant emission during the generation of the electrical energy by means of the proposed method, for example by specifying as a boundary condition that renewable energy is fed into the electrical supply network or into the corresponding balancing areas at maximum possible power.

Each balancing area preferably has precisely one balancing area controller.

It has been recognized that it is particularly favorable, particularly in relation to future challenges, to limit the number of balancing area controllers. For this purpose, it is proposed that each balancing area has precisely one balancing area controller which is configured to control the corresponding balancing area.

The balancing area controller is preferably configured to communicate with further balancing area controllers, particularly in order to exchange data for controlling the balancing areas.

The data to be exchanged can be the same as those which the balancing area controllers exchange with the network control station.

The electrical distribution network preferably has N network control stations and R balancing areas, in each case with S balancing area controllers, where $R \geq S \geq N$, preferably where $R \geq 5 N$ and $R=S$ and $N=1$.

It has been recognized that a control unit reduction has a particularly favorable impact on the method. It is thus proposed that at least as many balancing areas as balancing area controllers are provided. However, fewer balancing area controllers can also be provided if one balancing area controller controls a plurality of balancing areas. At least as many balancing areas as network control stations are also provided. One network control station is thus provided for one or more balancing areas.

In one particularly preferred embodiment, the electrical distribution network or the electrical supply network has precisely one network control station and the electrical distribution network or the electrical supply network is, for example, subdivided into at least 5 balancing areas, each having precisely one balancing area controller. The at least 5 balancing areas are preferably combined in each case into one balance node in order to carry out the method.

A node or balance node described above is understood to mean an internally self-organizing electrical unit which, when viewed from the outside, is a blackbox. The network control station or other nodes or balance nodes therefore do not know or only partially know the internal structure of a node or a balance node.

The generators of the balancing area are preferably controlled in such a way that the reactive power provided by the generators is optimized for minimal power dissipation.

The boundary conditions for optimization are thus selected in such a way that the reactive power generation or reactive power provision is performed as independently as possible from the active power generation or active power provision. The method can thus be used particularly advantageously to decouple the generation of the reactive power from the generation of the active power and/or to minimize the active power losses caused by the reactive power provision.

A balancing area controller for receiving an exchange power to be set is furthermore proposed, wherein the balancing area controller has at least one control device, in particular with a database, to draw up a deployment plan in order to control or at least participate in a method described above or below.

A wind farm for generating a generator power is furthermore proposed, wherein the wind farm is configured by means of a wind farm control unit to communicate with a balancing area controller in order to provide the generator power according to a deployment plan, wherein the deployment plan forms part of a method described above or below.

The wind farm preferably comprises the balancing area controller, wherein the balancing area controller has at least one control interface to control wind power installations and at least one communication interface to exchange data with a or the network control station.

A wind power installation is furthermore proposed, which is configured to communicate with a wind farm control unit of a wind farm described above or below in order to generate an electrical power which forms part of an electrical power which is generated by means of a wind farm depending on a deployment plan.

BRIEF DESCRIPTION OF THE SEVERAL VIEWS OF THE DRAWINGS

The present invention will now be explained in detail below by way of example on the basis of example embodiments with reference to the accompanying figures.

DETAILED DESCRIPTION

Figure 1:
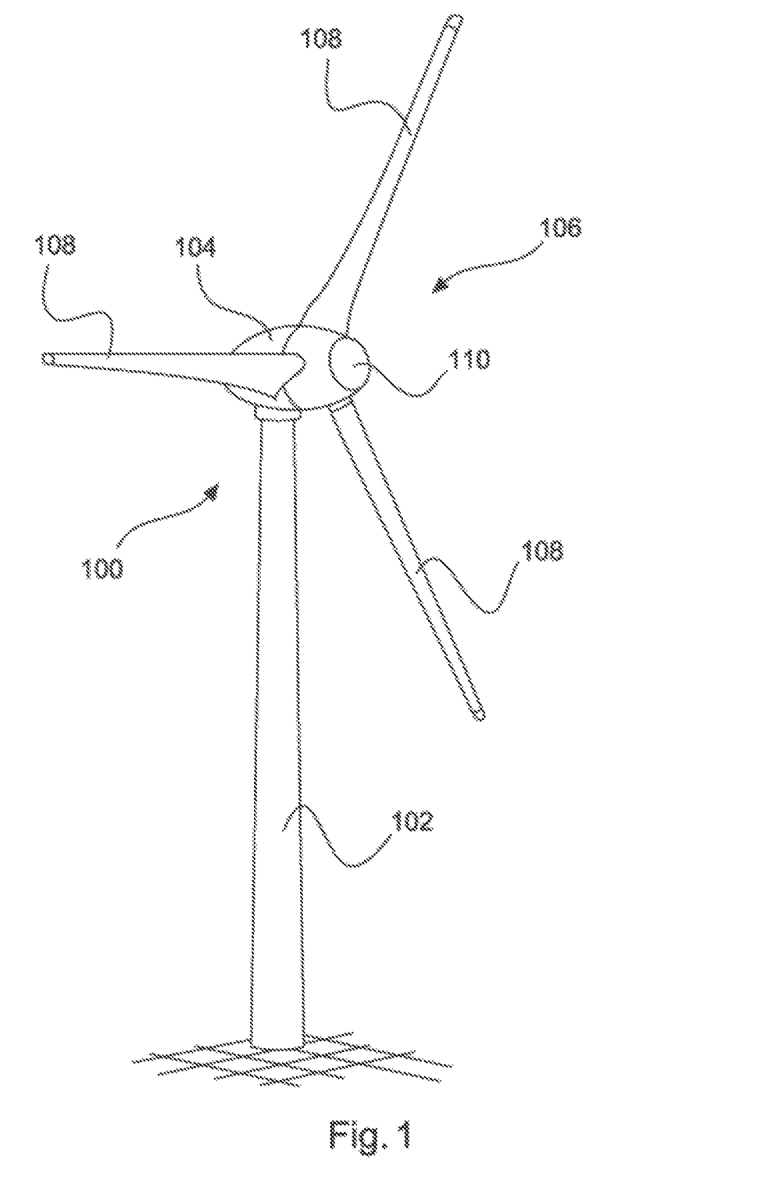
FIG. 1 shows schematically a perspective view of a wind power installation.

FIG. 1 shows a wind power installation 100 which is configured by means of a wind power installation control unit to communicate with a wind farm control unit of a wind farm in order to generate electrical power depending on a deployment plan.

The wind power installation has a tower 102 and a nacelle 104. A rotor 106 with three rotor blades 108 and a spinner 110 is disposed on the nacelle 104. The rotor 106 is set in rotational motion by the wind during operation and thereby drives a generator in the nacelle 104.

Figure 2:
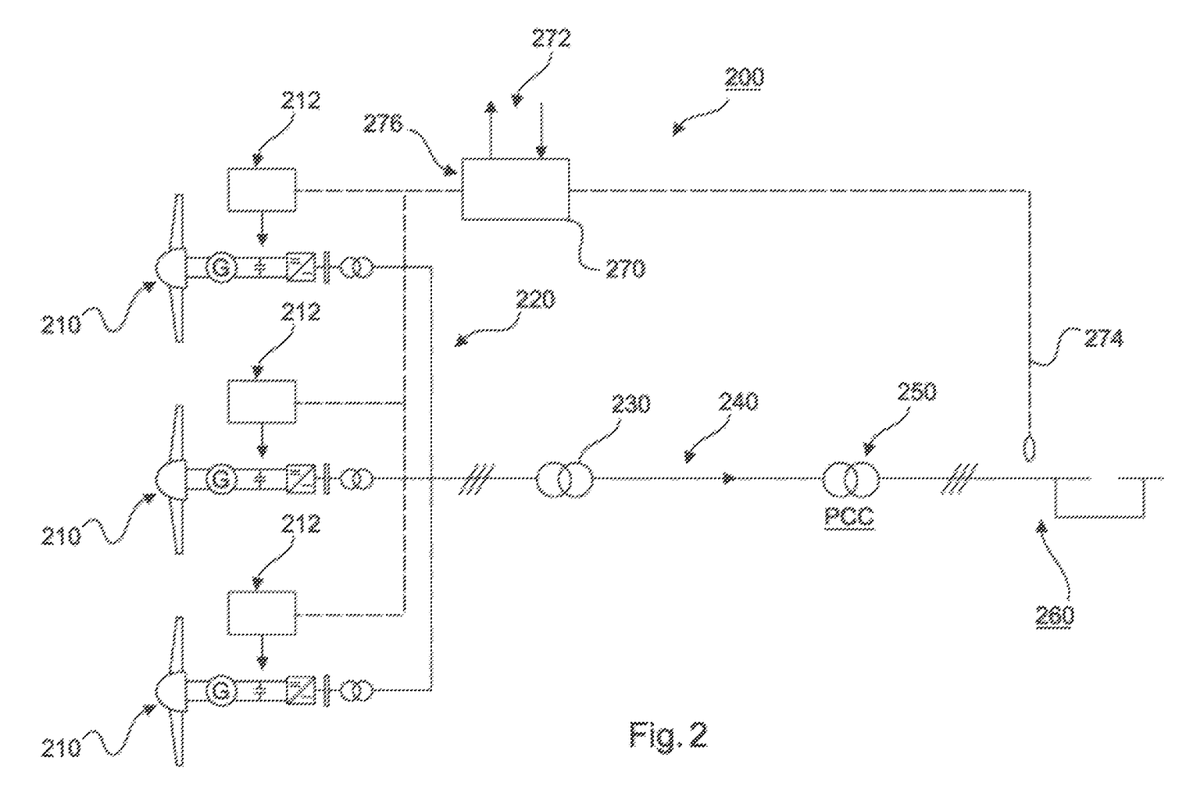
FIG. 2 shows schematically a structure of a wind farm according to the invention.

FIG. 2 shows a structure of a wind farm 200. The wind farm 200 has, by way of example, three wind power installations 210 which have an identical structure and are interconnected via a wind farm network 220. The wind power installations 210 comprise a wind power installation control unit 212 and in each case generate an electrical power which is fed via the wind farm network 220 into the electrical distribution network 260 by means of a wind farm transformer 230, a feed line 240 and a mains transformer 250 at a network connection point PCC.

The wind farm 200 has a wind farm control unit 270 which is configured by means of a communication interface 272 to exchange data with a balancing area controller and, in particular, to receive a deployment plan or power reference values from said balancing area controller in order to generate an electrical power depending on the deployment plan. For this purpose, the wind farm control unit 270 furthermore has a measuring device 274 to measure network parameters and a control interface 276 to control the wind power installations 210. By means of the control interface 276, the wind farm control unit 270 is configured to communicate with the wind power installation control unit 212 of the wind farm installations 210 of the wind farm 200, in particular to specify power reference values for the wind power installations 210 in order to generate an electrical power by means of the wind farm 200 depending on a deployment plan.

Figure 3:
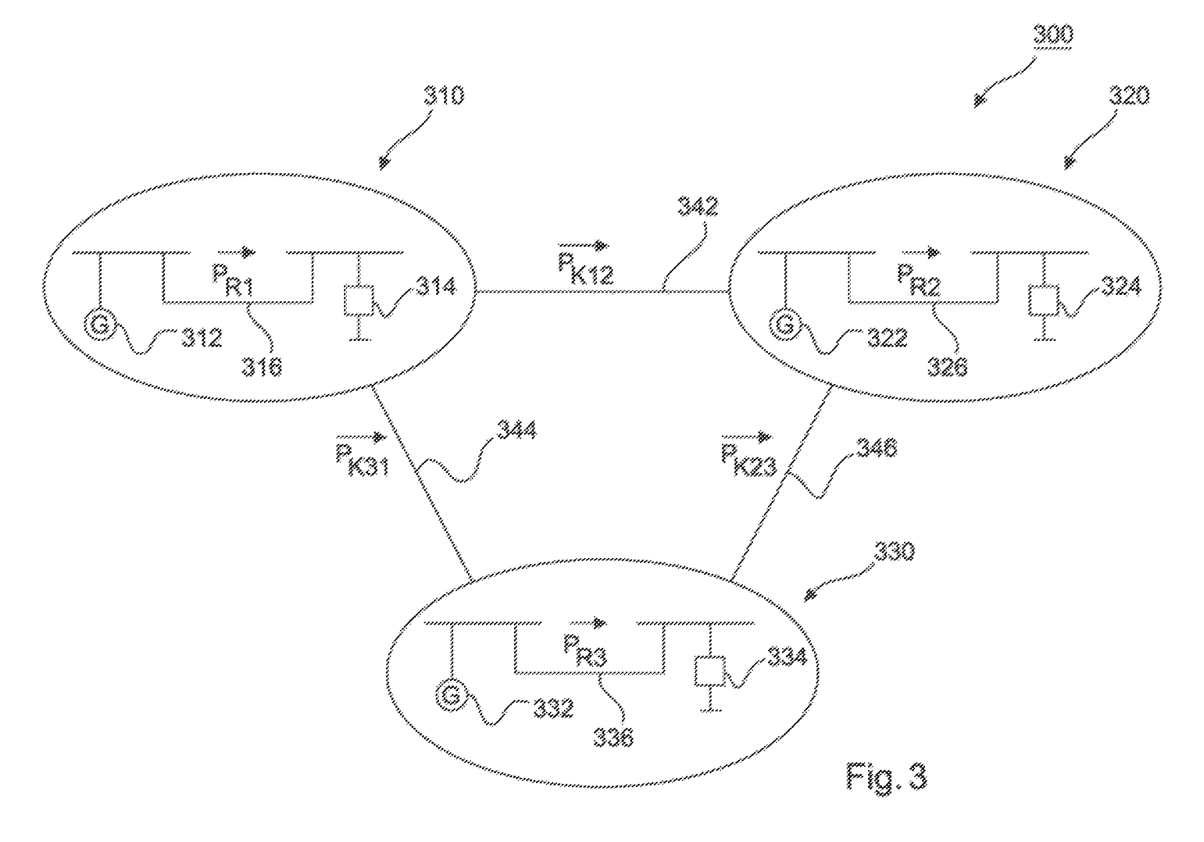
FIG. 3 shows schematically a structure of an electrical supply network.

FIG. 3 shows the schematic structure of an electrical supply network 300, wherein the electrical supply network comprises three electrical distribution networks 310, 320, 330 which are connected by means of interconnection lines 342, 344, 346.

Each distribution network 310, 320, 330 has a multiplicity of generators 312, 322, 332 and consumers 314, 324, 334 which are interconnected in each case via lines 316, 326, 336.

Within each distribution network 310, 320, 330, a balancing power PR1, PR2, PR3 is provided by controlling the generators 312, 322, 332, in order to set a power balance between the generators 312, 322, 332 and the consumers 314, 324, 334. The balancing power is thus used to compensate a difference between the generated and consumed power. If this balancing power PR1, PR2, PR3 within each distribution network 310, 320, 330 is not sufficient to guarantee a necessary operational reliability, the individual distribution networks 310, 320, 330 can draw an interconnection power PK12, PK23, PK31 from adjacent distribution networks 310, 320, 330 via interconnection lines 342, 344, 346 in order to establish a power balance, i.e., a balance between generated and consumed power, within the distribution network 310, 320, 330, for example in order to prevent a disruption within the network balancing system 310, 320, 330. The interconnection lines 342, 344, 346 are intended to indicate, by way of example, the electrical transmission network of the electrical supply network which interconnects the individual electrical distribution networks 310, 320, 330.

The operational management of the individual distribution networks 310, 320, 330 is performed by a series of control mechanisms, such as, for example, a balancing group management.

Figure 4A:
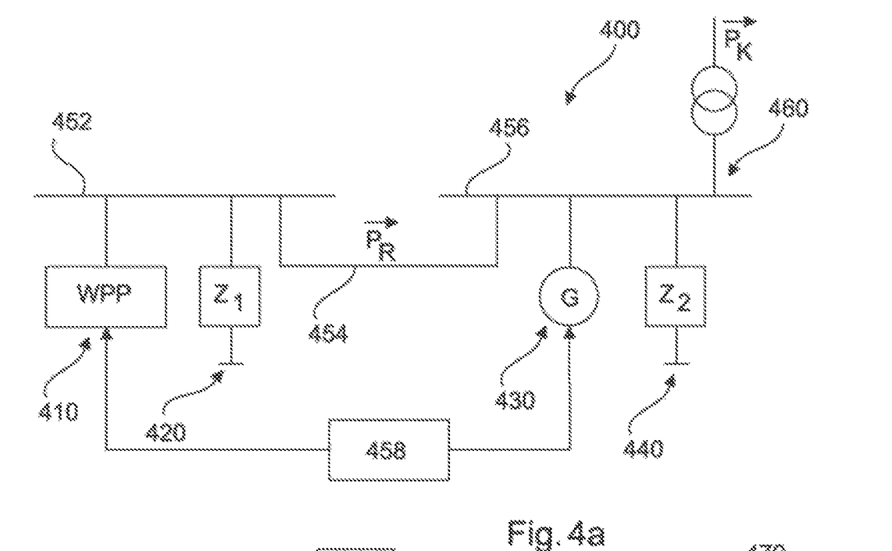
FIG. 4a shows schematically a structure of an electrical distribution network.

FIG. 4a shows schematically a structure of an electrical distribution network 400 or a part thereof. The electrical distribution network 400 shown in FIG. 4a has a wind farm 410, a first consumer 420, a conventional generator 430 and a further consumer 440, wherein the lines 452, 454, 456 of the electrical distribution network 400 are interconnected. The wind farm 410 and the conventional generator 430 are normally controlled depending on the network frequency in such a way that a power balance is set within the electrical distribution network 400, said power balance being indicated by the exchange of balancing power PR within the electrical distribution network 400. The generators can be controlled by a control station 458. The electrical distribution network is furthermore connected by means of an interconnection line 460 to the electrical supply network or further distribution networks in order to receive an interconnection power PK if necessary from the electrical supply network if power is required in order to establish the power balance in the electrical distribution network 400.

Figure 4B:
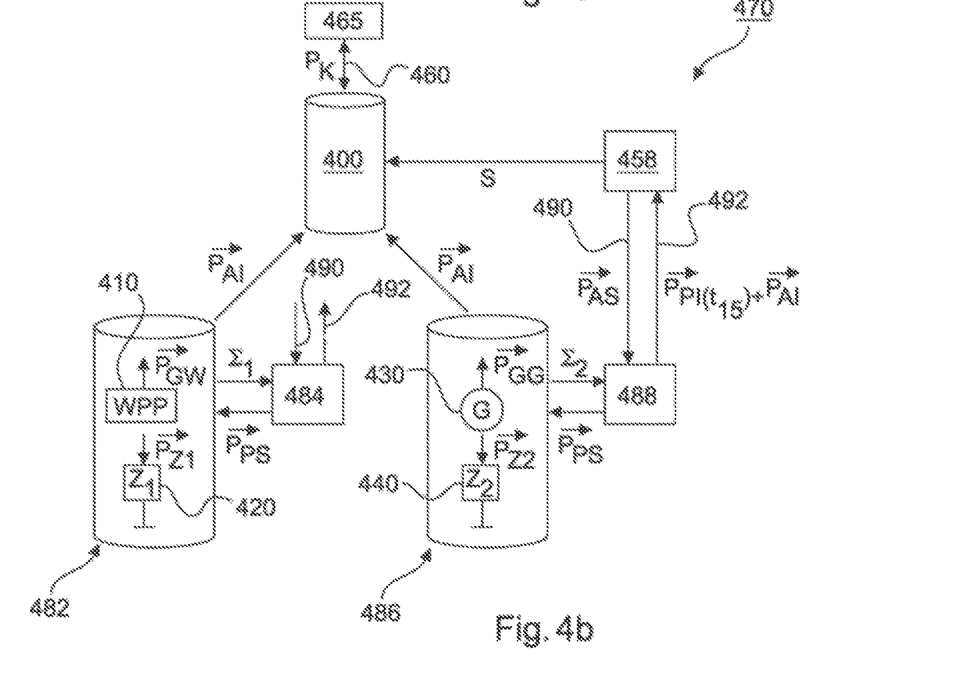
FIG. 4b shows schematically an organizational structure of a method.

FIG. 4b shows schematically an organizational structure of the method 470 with reference to the electrical distribution network 400 shown in FIG. 4a which has a network control station 458 in order to control the electrical distribution network 400 by means of signals S, wherein the electrical distribution network 400 is connected by means of interconnection lines to other electrical distribution networks or to the electrical supply network 465.

The electrical distribution network 400 shown by way of example in FIG. 4a has been subdivided into two balancing areas, i.e., a plurality of generators and consumers are combined in relation to the electrical distribution network 400 into a balance node 482, 486, in each case forming or representing a balancing area. FIG. 4b thus shows a proposed division of the structure shown in FIG. 4a into balancing nodes 482 and 486 which in each case balance one another independently, i.e., in such a way that they provide or receive the requested exchange power. In the internal implementation, each balancing node can control its consumers and generators flexibly for this purpose.

The balancing node or balance node 482 comprises the wind farm 410 and the additional consumer 420. The balancing node or balance node 486 comprises the conventional generator 430 and the consumer 440.

The generators and consumers of the balance nodes, i.e., the generators and consumers 410, 420, 430, 440 within the balancing areas 482, 486, are controlled in each case via the balancing area controllers 484, 488 which are connected to the network control station 458 for the exchange of data.

The balancing area controllers 484, 488 receive the exchange power to be set PAS from the network control station 458 via a data line 490. The balancing area controllers 484, 488 draw up a deployment plan therefrom to control the generators and consumers, wherein the deployment plan is drawn up in such a way that a difference between the attained exchange power PAI and the exchange power to be set PAS is minimal.

To do this, the balancing area controllers 484, 488 transmit active and reactive power reference values PPS to the generators of the balancing areas, wherein the active and reactive power reference values PPS are selected depending on the deployment plan in such a way that the difference between the exchange power and the exchange power to be set is minimal.

The balancing area controllers 484, 488 then define a forecast value PPI which is transmitted by means of a data line 490 to the network control station 458.

The forecast value PPI comprises a providable exchange power of the corresponding balancing areas 482, 486 for a predefined time interval t15 and the current exchange power PAI, wherein the forecast value PPI is based on a weather forecast. The current exchange power PAI is made up here of the difference between the consumer power PZ1, PZ2 and the generator power PGW, PGG, which can also be indicated in the reference arrow system as the sum $\Sigma 1$ or $\Sigma(PGW+PZ1)$, $\Sigma 2$ or $\Sigma(PGG+PZ2)$.

The network control station 458 receives the forecast values PPI of the balancing areas for a predefined time period, for example a forecast value PPI for the next 24 hours. The network control station 458 then produces new exchange powers to be set PAS for the balancing areas, wherein an optimization algorithm which takes account of the respective forecast values PPI is used for this purpose. Some values, such as the exchange power PAS to be set via the data line 490, are denoted with the same reference numbers or abbreviations in the figures, but can assume different values, particularly for the different balance nodes 482 and 486, or different balancing areas.

The generators 410, 430 then generate a corresponding electrical power PGW, PGG depending on the active and reactive power reference values PPS which have been produced by balancing area controllers 484, 488 depending on the deployment plan.

In one particularly preferred embodiment, the method thus has two optimization cycles. On the one hand, the network control station 458 collects all forecast values PPI and instantaneous values PAI of all balancing areas 482, 486 in order to calculate an exchange power therefrom for each balancing area 482, 486 and, on the other hand, each balancing area controller 484, 488 optimizes each balancing area 482, 486 depending on the exchange power to be set PAS in such a way that the balancing areas operate at least according to a settable boundary condition. The maximum use of renewable energies, for example, can be used as a boundary condition for the optimization of a balancing area so that the exchange power specified by the network control station is attained by means of maximum utilization of renewable energies, i.e., for example, all wind farms are operated at full load. The method itself can be carried out, for example, on a 15-minute cycle, i.e., new values are transmitted and calculated every 15 minutes.

Figure 5:
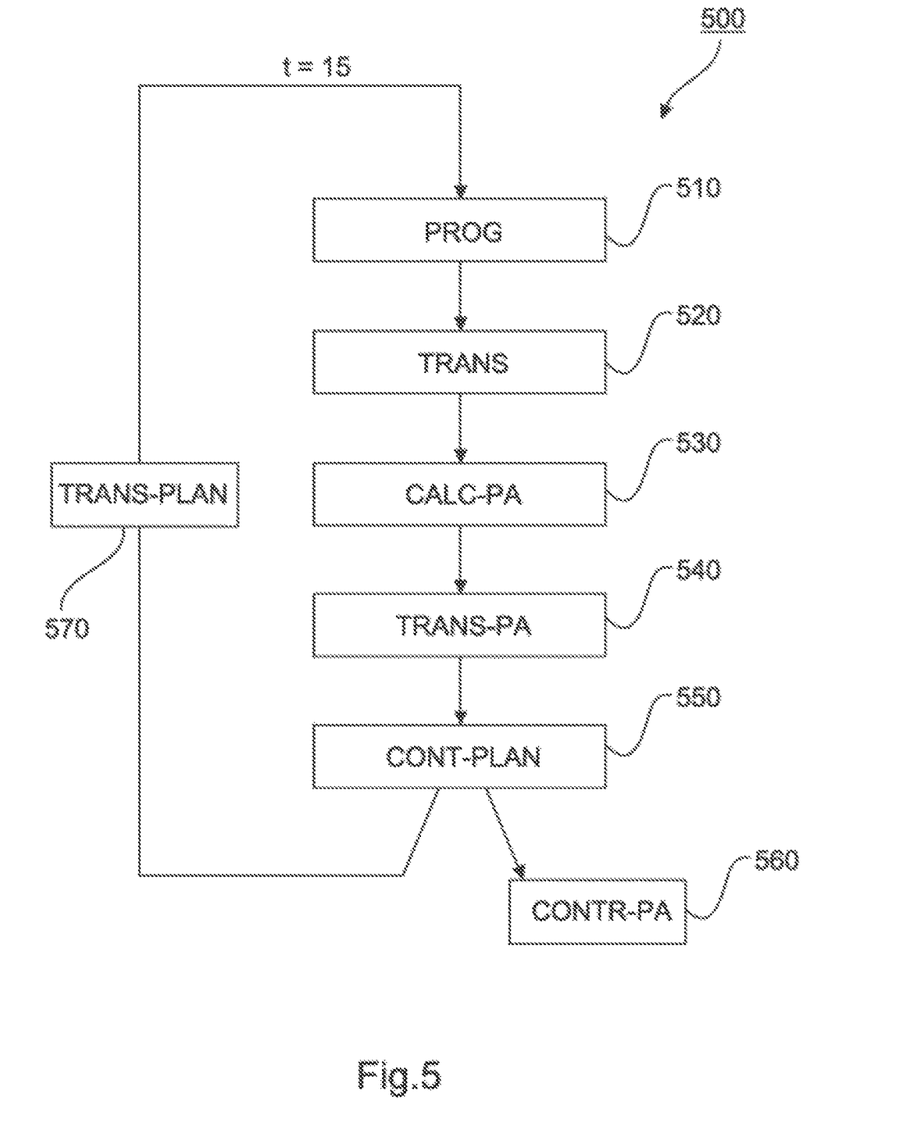
FIG. 5 shows schematically a process for drawing up a deployment plan for the adherence by a balancing area controller according to the invention to an exchange power to be set.

FIG. 5 shows schematically a process for drawing up a deployment plan 500 for the adherence by a balancing area controller to an exchange power to be set.

In a first step 510, the balancing area controller defines a forecast value for the exchange power provided by the balancing area for a predefined forecast time period. The forecast value comprises a 1-minute instantaneous value which maps the actual exchange power, and also a forecast for a guaranteed exchange power for the next 24 hours. The forecast for the powers is produced using a weather report, in particular using a weather forecast. This is indicated by the PROG block.

This forecast value, which can also be referred to as the forecast timetable, is then transmitted to the network control station in a next step 520. This is indicated by the TRANS block.

The network control station receives all forecast values, which may also contain actual values, and, optionally, timetables of all generators and consumers participating in the method, or at least some of such timetables, in a next step 530, and in each case calculates therefrom an exchange power to be set for each balancing area. For example, using the boundary condition that the exchange powers to be attained for each balancing area are minimal in terms of amount. Due to a procedure of this type, each balancing area can define its respective deployment plan with maximum autonomy, since the exchange power to be set approaches 0 MW. This is indicated by the CALC-CA block.

The exchange power to be set is then transmitted to the balancing area controller in a next step 540. This is indicated by the TRANS-PA block.

In a next step 550, the balancing area controller receives a value relating to the exchange power to be set for the balancing area as a reference value and, depending thereon, calculates a deployment plan for adhering to the exchange power to be set, wherein the deployment plan is provided to control the generators and consumers and is drawn up in such a way that a difference between the attained exchange power and the exchange power to be set is minimal. The forecast of the probable reference values is taken into account in order to control the use of generators and consumers in an optimum manner. The use of controllable consumers and generators can thus be flexibly optimized. The deployment plan is drawn up, for example, using the boundary condition that the output power of renewable energies is maximal. As a result, the balancing area then generates its electrical energy exclusively from renewable energies, for example from wind farms. This is indicated by the CONT-PLAN block.

In a further step 560, the balancing area controller then transmits the deployment plans or the reference values of the deployment plans to the generators of the balancing area which then generates electrical power depending on the deployment plan. This is indicated by the CONTR-PA block.

In a further step 570, the balancing area controller furthermore transmits the deployment plan as a forecast value for the exchange power providable by the balancing area for the predefined forecast period to the network control station. This is indicated by the TRANS-PLAN block.

The drawing up of the deployment plan is thus cyclical, for example with a 15-minute cycle time, i.e., the deployment plan and all reference values are repeatedly recalculated at a 15-minute time interval.

Figure 6:
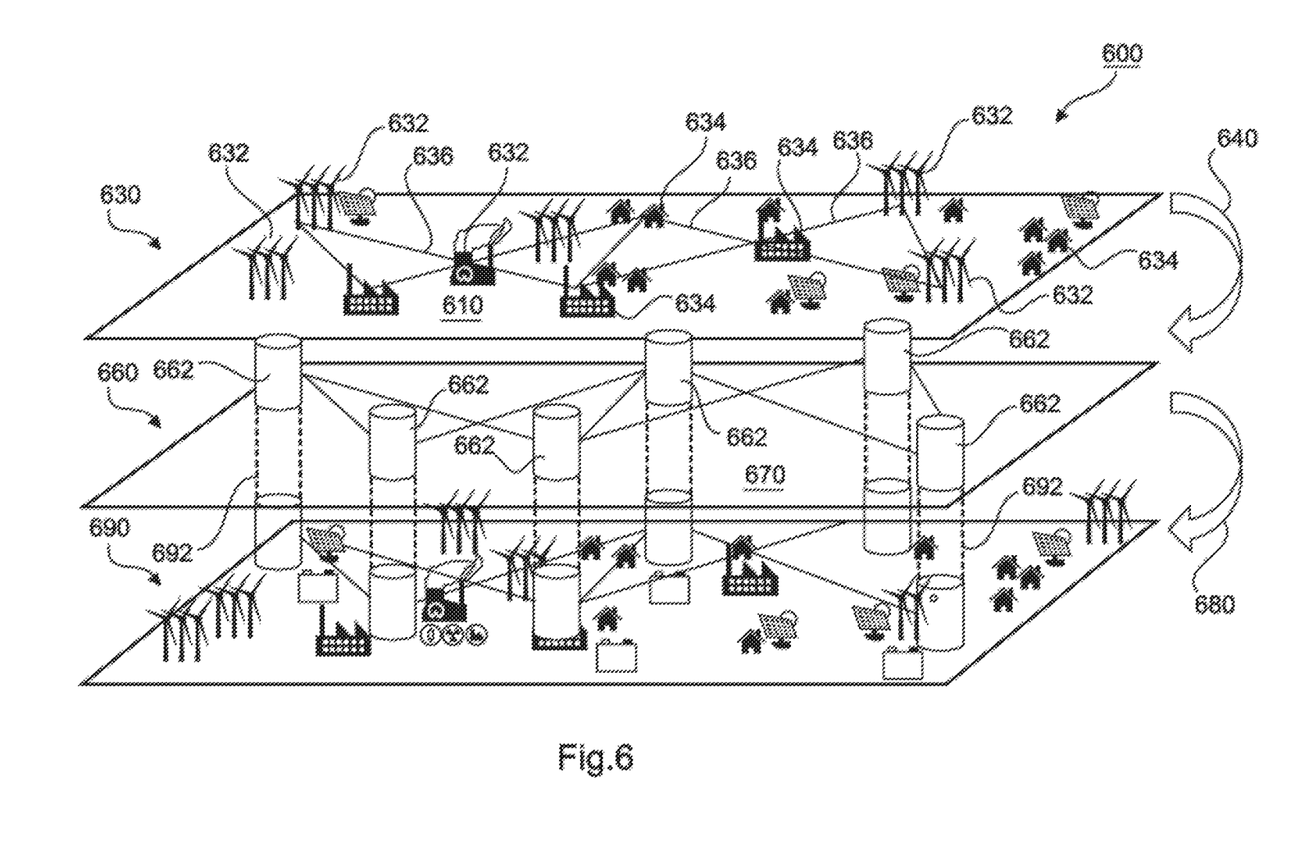
FIG. 6 shows a schematic structure 600 of a method in a layered view.

FIG. 6 shows a schematic structure 600 of a method in a layered view, comprising a first, a second and a third layer 630, 660, 690.

In the first layer 630, an electrical distribution network 610 is mapped which has a plurality of generators 632 and a plurality of consumers 634 which are interconnected via electrical lines 636.

The electrical distribution network is now divided by means of the method into a plurality of balancing areas 662 or nodes, wherein the balancing areas 662 or nodes in each case comprise a plurality of generators and/or consumers.

The electrical distribution network 610 is thus combined into a node model 670. This combination is indicated by the first transfer arrow 640 and this node model 670 is represented in the second layer 660.

The electrical distribution network 610 is therefore controlled by means of a node model or balancing area model 670. This is indicated by the second transfer arrow 680 and the result is shown in the third layer 690. The transfer of the node model 670 onto the electrical distribution network 610 is furthermore indicated by lines 692.

The invention claimed is:

1. A method for controlling an electrical distribution network, wherein a network control station is configured to control the electrical distribution network and the electrical distribution network comprises a plurality of balancing areas, wherein each of the plurality of balancing areas is configured to output or receive an exchange power to or from the electrical distribution network, wherein at least one of the plurality of balancing areas has at least one generatorconfigured to generate a generator power and has at least one consumer configured to receive a consumer power, and wherein at least one balancing area controller is configured to control the at least one generator, the method comprises:
 receiving, by the at least one balancing area controller from the network control station, a value of an exchange power to be set, wherein the exchange power is defined as a difference between the consumer power and the generator power;
 determining, by the at least one balancing area controller, a deployment plan for adherence to or attainment of the exchange power to be set, wherein the deployment plan is configured to control the at least one generator and at least one consumer and is determined in such a way that a difference between an attained exchange power and the exchange power to be set is minimized; and
 generating electrical power by the at least one generator in dependence on the deployment plan.

2. The method for controlling an electrical distribution network as claimed in claim 1, further comprising:
 transmitting a plurality of reference values by the at least one balancing area controller to the at least one generator and to the at least one consumer, wherein the plurality of reference values are selected depending on the deployment plan in such a way that the difference between the attained exchange power and the exchange power to be set is minimized.

3. The method for controlling an electrical distribution network as claimed in claim 1, further comprising:
 defining, by the at least one balancing area controller, at least one forecast value for at least one of: an exchange power providable or generator power generatable by the at least one balancing area for a predefined forecast time period; and
 transmitting the at least one forecast value from the at least one balancing area controller to the network control station, wherein the at least one forecast value includes an instantaneous value that reflects an instantaneously achieved exchange power of the at least one balancing area.

4. The method for controlling an electrical distribution network as claimed in claim 3, wherein the predefined forecast time period is one day or has an upper limit of 24 hours.

5. The method for controlling an electrical distribution network as claimed in claim 3, wherein the exchange power to be set is determined depending on the at least one forecast value or the instantaneous value.

6. The method for controlling an electrical distribution network as claimed in claim 3, wherein the at least one forecast value is based on parameters of the at least one generator.

7. The method for controlling an electrical distribution network as claimed in claim 3, wherein the at least one forecast value is based on parameters of a plurality of generators, wherein the parameters are rated powers of the plurality of generators.

8. The method for controlling an electrical distribution network as claimed in claim 3, wherein the at least one balancing area has a wind farm, wherein the at least one forecast value is based on parameters of the wind farm.

9. The method for controlling an electrical distribution network as claimed in claim 1, wherein the attained exchange power of the at least one balancing area comprises a reactive power value and an active power value.

10. The method for controlling an electrical distribution network as claimed in claim 1, wherein the deployment plan comprises a predefined time interval which has optimized reactive and active power reference values, wherein the predefined time interval is 15 minutes or less.

11. The method for controlling an electrical distribution network as claimed in claim 1, wherein the plurality of balancing areas are configured and the deployment plan is determined in such a way that at least one of:
 the exchange powers to be attained for the plurality of balancing areas are minimized in terms of amount,
 the exchange powers to be attained for the plurality of balancing areas are minimized using an optimization method in which the exchange powers to be attained for the plurality of balancing areas are minimized using a least squares method,
 the exchange powers to be attained for the plurality of balancing areas are optimized via a cost function, or
 a potential emission of pollutants by conventional generators of the electrical supply network of the plurality of balancing areas is minimized.

12. The method for controlling an electrical distribution network as claimed in claim 1, wherein each of the plurality of balancing areas has a balancing area controller.

13. The method for controlling an electrical distribution network as claimed in claim 1, wherein the balancing area controllers communicate with each other and exchange data for controlling the plurality of balancing areas.

14. The method for controlling an electrical distribution network as claimed in claim 1, wherein the electrical distribution network has N network control stations and R balancing areas, in each case with S balancing area controllers, where $R \geq S \geq N$.

15. The method for controlling an electrical distribution network as claimed in claim 1, wherein the at least one balancing area is controlled in such a way that reactive power provided by the at least one generator is optimized for minimal power dissipation.

16. A balancing area controller for receiving an exchange power to be set, wherein the balancing area controller has a least one control device to determine a deployment plan, wherein the balancing area controller is configured to control at least a portion of the method as claimed in claim 1.

17. The balancing area controller as claimed in claim 16, wherein the least one control device includes a database.

18. A wind farm for generating a generator power, the wind farm comprising:
 at least one wind power installation; and a wind farm control unit that is configured to communicate with a balancing area controller to provide generator power according to the method of claim 1.

19. The wind farm as claimed in claim 18, comprising the balancing area controller, wherein the balancing area controller has at least one control interface to control a plurality of wind power installations and at least one communication interface to exchange data with the network control station.

20. A wind power installation of the wind farm as claimed in claim 18.

* * * * *

UNITED STATES PATENT AND TRADEMARK OFFICE
CERTIFICATE OF CORRECTION

Page 1 of 1

PATENT NO.         : 10,784,690 B2
APPLICATION NO.    : 16/473759
DATED              : September 22, 2020
INVENTOR(S)        : Johannes Brombach et al.

It is certified that error appears in the above-identified patent and that said Letters Patent is hereby corrected as shown below:

In the Claims

Column 13, Claim 1, Lines 19-20:
"one generatorconfigured"
Should read:
--one generator configured--.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*